US008644552B2

(12) United States Patent
Han et al.

(10) Patent No.: US 8,644,552 B2
(45) Date of Patent: Feb. 4, 2014

(54) MARKERLESS MOTION CAPTURING APPARATUS AND METHOD

(75) Inventors: Young Ran Han, Suwon-si (KR); Seung Sin Lee, Yongin Si (KR); Du-Sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 496 days.

(21) Appl. No.: 12/923,864

(22) Filed: Oct. 12, 2010

(65) Prior Publication Data

US 2011/0085704 A1    Apr. 14, 2011

(30) Foreign Application Priority Data

Oct. 13, 2009   (KR) .................. 10-2009-0097203

(51) Int. Cl.
*G06K 9/00*   (2006.01)
(52) U.S. Cl.
USPC .......................................... 382/103; 382/107
(58) Field of Classification Search
USPC .......................................... 382/103, 107, 173
See application file for complete search history.

(56) References Cited

U.S. PATENT DOCUMENTS

| | | | |
|---|---|---|---|
| 7,257,237 B1 * | 8/2007 | Luck et al. .................... | 382/103 |
| 7,308,332 B2 * | 12/2007 | Okada et al. .................. | 700/130 |
| 8,023,726 B2 * | 9/2011 | Sundaresan et al. ........... | 382/154 |
| 8,139,067 B2 * | 3/2012 | Anguelov et al. ............. | 345/473 |
| 8,433,094 B1 * | 4/2013 | Nguyen ........................ | 382/103 |
| 2008/0031512 A1 | 2/2008 | Mundermann et al. | |
| 2009/0153568 A1 * | 6/2009 | Jeong et al. ................... | 345/474 |

FOREIGN PATENT DOCUMENTS

| | | |
|---|---|---|
| JP | 2005-339100 | 12/2005 |
| KR | 10-2004-0008379 | 1/2004 |
| KR | 10-2004-0055310 | 6/2004 |
| KR | 10-2007-0057613 | 6/2007 |
| KR | 10-2007-0120443 | 12/2007 |

OTHER PUBLICATIONS

Takahashi K et al. "Remarks on Simple Motion Capture Using Heuristic Rules and Monte Carlo Filter", Image and Graphics, 2009. ICIG '09. Fifth International Conference on, IEEE, Piscatway, NJ, USA, Sep. 20, 2009, pp. 808-813.

Jang-Hee Yoo et al: "Automated Human Recognition by Gait using Neural Network", Image Processing Theory, Tools and Applications, 2008. IPTA 2008. First Workshops on, IEEE, Piscataway, NJ, USA, Nov. 23, 2008, pp. 1-6.

Feifei Huo et al. "Markerless human motion capture and pose recognition", Image Analysis for Multimedia Internactive Services, 2009. WIAMIS 09. 10 Workshop on, IEEE, Piscataway, NJ, USA, May 6, 2009, pp. 13-16.

(Continued)

*Primary Examiner* — Utpal Shah
(74) *Attorney, Agent, or Firm* — Staas & Halsey LLP

(57) ABSTRACT

A markerless motion capturing apparatus and method is provided. The markerless motion capturing apparatus may track a pose and a motion of a performer from an image, inputted from a camera, without using a marker or a sensor, and thereby may extend an application of the markerless motion capturing apparatus and selection of a location.

16 Claims, 18 Drawing Sheets

(56) References Cited

OTHER PUBLICATIONS

Kazuhiko Takahashi et al: "Remarks on markerless human motion capture from voxel reconstruction with simple human model", Intelligent Robots and Systems, 2008. IROS 2008. IEEE.RSJ International Confernece on, IEEE, Piscataway, NJ, USA, Sep. 22, 2008, pp. 755-760.

J. Vignola, J.-F. Lalonde, and R. Bergevin: "Progressive Human Skeleton fitting.", Proc. of the 16$^{th}$ Conference on Vision Interface, Jun. 11, 2003, pp. 35-42.

Poppe et al: "Vision-based human motion analysis: An overview", Computer Vision and Image Understanding, Academic Press, US, vol. 108, No. 1-2, Sep. 1, 2007, pp. 4-18.

Moeslund T B et al: "A Survey of Computer 1-15 Vision-Based Human Motion Capture", Computer Vision and Image Understanding, Academic Press, US, vol. 81, No. 3, Mar. 1, 2001, pp. 231-368.

European Search Report mailed Feb. 9, 2011 in European Application No. 10 187 267.9-2218.

\* cited by examiner

P.length

P.direction

US 8,644,552 B2

MARKERLESS MOTION CAPTURING APPARATUS AND METHOD

CROSS-REFERENCE TO RELATED APPLICATIONS

This application claims the priority benefit of Korean Patent Application No. 10-2009-0097203, filed on Oct. 13, 2009, in the Korean Intellectual Property Office, the disclosure of which is incorporated herein by reference.

BACKGROUND

1. Field

Example embodiments relate to a motion capturing technology that may estimate and track a pose and motion of a performer in real time.

2. Description of the Related Art

A motion capturing technology may be widely used to generate natural movement of a character in a three-dimensional (3D) content production field such as an animation, movie, broadcasting content, game, and the like. Also, since a motion capturing technology may be used for analyzing a gesture of an object, an application of a motion capturing technology may increase along with the development of an interactive display.

In a motion capturing technology, a motion of a performer may be captured by attaching a sensor or a marker to a body or a cloth of the performer, and thus expensive special equipment may be required. Also, since a sensor reacting to a change of a performer environment may be very sensitive, a noise may be included in location information of a captured image.

Accordingly, research on a motion capturing technology to reduce a cost and a noise in a captured image has been currently conducted.

SUMMARY

The foregoing and/or other aspects of one or more embodiments may be achieved by providing a markerless motion capturing apparatus, including: a motion tracking information determination unit to calculate body information of a performer from an image, and to determine a motion trajectory of the performer; a silhouette tracking unit to track a silhouette of the performer in the image; and a joint detection unit to detect a joint of the performer using the motion trajectory and the silhouette.

The motion tracking information determination unit may calculate a size of a body portion of the performer from the image including an entire body of the performer, and determine the motion trajectory indicating a range that the body portion moves.

The silhouette tracking unit may sequentially retrieve a point where the silhouette and a searching window are crossed, and track the silhouette of the performer, the searching window being set based on a location of a reference joint.

The joint detection unit may detect the joint of the performer in a joint search area which is determined based on the motion trajectory and the silhouette. The joint detection unit may detect at least one of a head, a hand, a shoulder joint, an elbow joint, a wrist joint, a knee joint, an ankle joint, and a hip joint of the performer using the motion trajectory and the silhouette.

The foregoing and/or other aspects of one or more embodiments may be achieved by providing a markerless motion capturing apparatus, including: a depth extraction unit to extract a depth using an image received from each of two photographing apparatuses; a motion tracking information determination unit to calculate body information of a performer from an image, and to determine a motion trajectory of the performer; a silhouette tracking unit to track a silhouette of the performer in the image; and a joint detection unit to detect a joint in two-dimensional (2D) space of the performer using the motion trajectory and the silhouette; and a joint restoration unit to restore a joint in three-dimensional (3D) space from the joint in the 2D of the performer using the depth.

The foregoing and/or other aspects of one or more embodiments may be achieved by providing a markerless motion capturing apparatus, including: a motion tracking information determination unit to calculate body information of a performer from an image, which is received from a photographing apparatus from among three photographing apparatuses, and to determine a motion trajectory of the performer, the photographing apparatus being located in front of the performer; a silhouette tracking unit to track a silhouette of the performer with respect to an image which is received from each of the three photographing apparatuses; and a joint detection unit to detect a joint in two-dimensional (2D) space of the performer with respect to the image, received from each of the three photographing apparatuses, using the motion trajectory and the silhouette; and a joint restoration unit to restore a joint in three-dimensional (3D) space of the performer using a location of the joint in the 2D detected from the image received from each of the three photographing apparatuses.

The foregoing and/or other aspects of one or more embodiments may be achieved by providing a markerless motion capturing method, including: calculating body information of a performer from an image, and determining a motion trajectory of the performer; tracking a silhouette of the performer in the image; and detecting a joint of the performer using the motion trajectory and the silhouette.

According to another aspect of one or more embodiments, there is provided at least one computer readable medium storing computer readable instructions to implement methods of embodiments.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
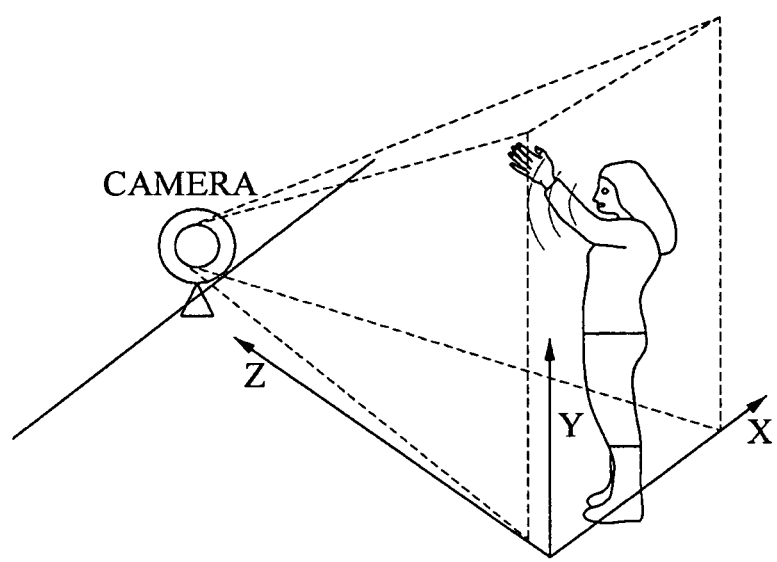
FIG. 1 illustrates a markerless motion capturing apparatus using a single camera according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a markerless motion capturing apparatus using a single camera according to example embodiments.

Referring to FIG. 1, the motion capturing apparatus may receive an image, photographed by the single camera, and capture a motion of a performer. In this instance, the camera may be arranged in front of the performer by a predetermined distance. Here, the distance between the camera and the performer may be predetermined to enable an entire body of the performer to be photographed.

Hereinafter, an operation of capturing the motion of the performer using the photographed image is described in detail with reference to FIG. 2.

Figure 2:
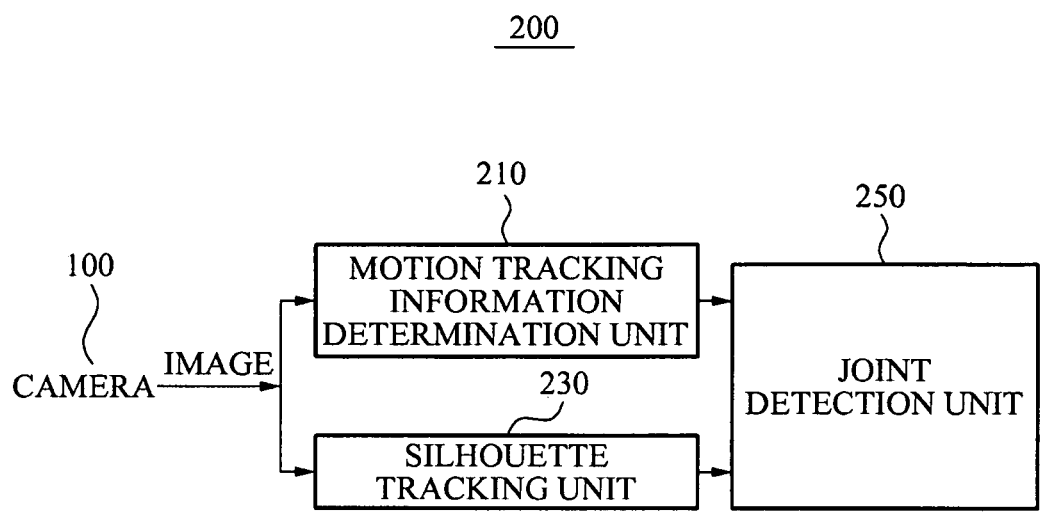
FIG. 2 illustrates a configuration of a markerless motion capturing apparatus according to example embodiments.

FIG. 2 illustrates a configuration of a markerless motion capturing apparatus according to example embodiments.

Referring to FIG. 2, the markerless motion capturing apparatus may include a motion tracking information determination unit 210, a silhouette tracking unit 230, and a joint detection unit 250.

The motion tracking information determination unit 210 may calculate body information of a performer from an image, and determine a motion trajectory of the performer. Here, the image may be photographed by a camera 100, and include a portion or entire body of the performer.

Specifically, the motion tracking information determination unit 210 may calculate the body information of the performer using the image, photographed by the camera 100, and previously obtained body proportion information.

Figure 3:
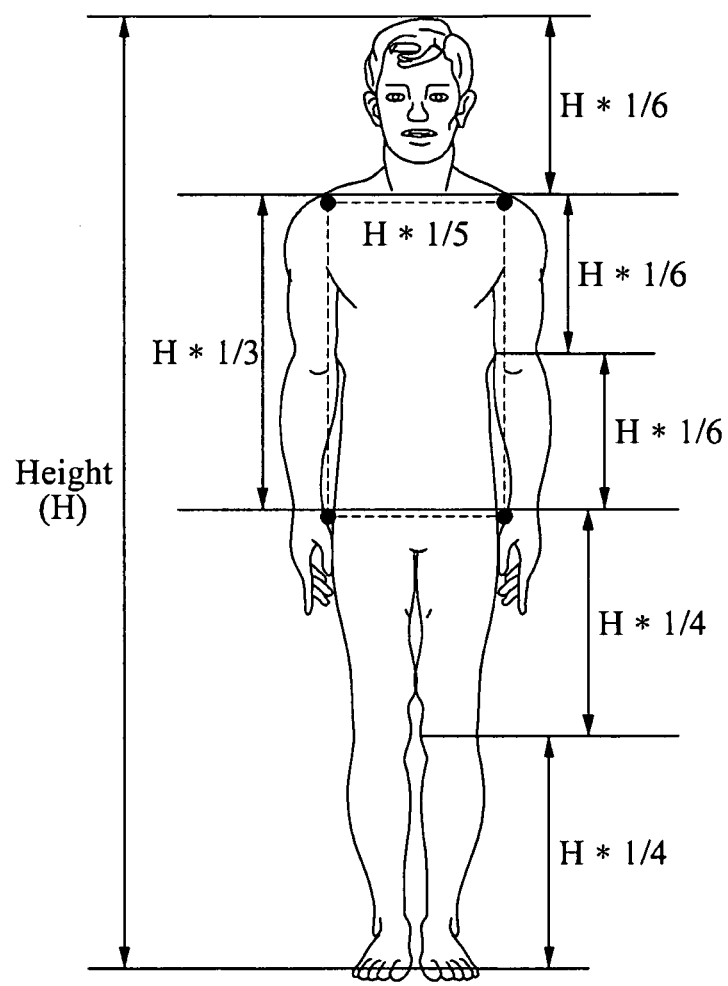
FIG. 3 illustrates an example of body proportion information based on a joint according to example embodiments.

That is, referring to FIG. 3, the motion tracking information determination unit 210 may calculate a height (H) of the performer from the photographed image, and calculate the body information of the performer in a pixel unit, using the calculated height and the previously obtained body proportion information.

Here, the body information of the performer may indicate a size of each body portion of the performer. Also, the body information may include a head length (H×⅙), a torso length (H×⅓), a body width (H×⅕), a length (H×⅙) from a shoulder joint to an elbow joint, a length (H×⅙) from the elbow joint to a wrist joint, a length (H×¼) from a hip joint to a knee joint, a length (H×¼) from the knee joint to an ankle joint.

In this instance, the body proportion information may be obtained on-line or off-line, or be previously set in the markerless motion capturing apparatus.

Figure 4:
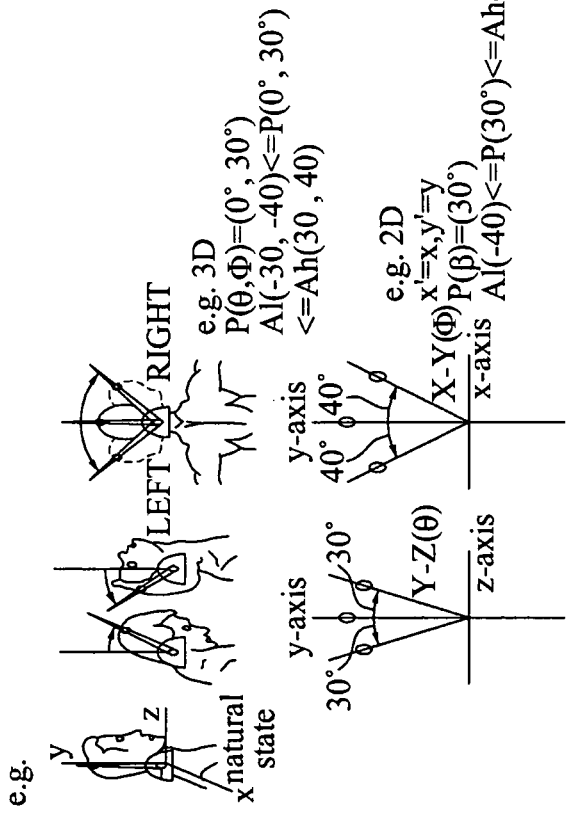
FIG. 4 illustrates an example for joint motion range information according to example embodiments.

Also, as illustrated in FIG. 4, the motion tracking information determination unit 210 may determine a motion trajectory which is calculated using previously obtained joint motion range information. The motion trajectory may indicate a range that each body portion, that is, each joint of the performer, moves. For example, the motion trajectory may be a motion angle.

Specifically, referring to FIG. 4, the motion tracking information determination unit 210 may determine the motion trajectory where a head of the performer moves upwards, downwards, forwards and backwards using the joint motion range information and the calculated head length. In a same manner, the motion tracking information determination unit 210 may determine the motion trajectory where each joint of the performer moves using the calculated body information and the joint motion range information.

The silhouette tracking unit 230 may track a silhouette of the performer in the image, photographed by the camera 100, using a predetermined searching window and a reference joint. Here, the searching window may be predetermined as a circle 510 as shown in FIG. 5 or a polygon such as a triangle, a rectangle 520 as shown in FIG. 5, and the like.

Figure 5:
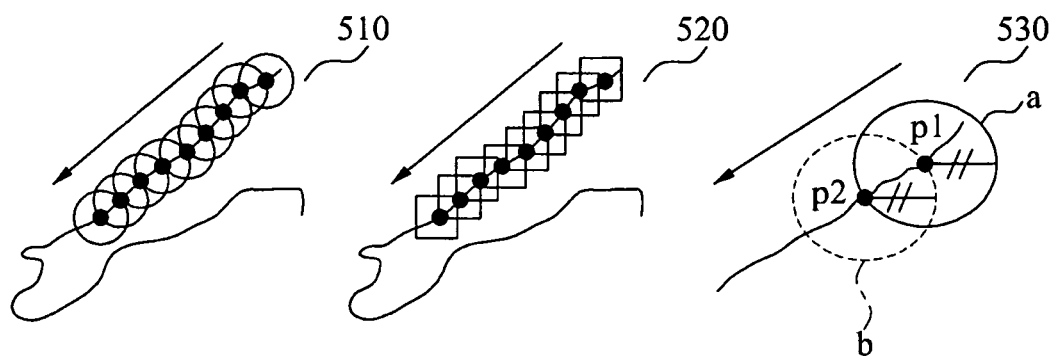
FIGS. 5 and 6 illustrate examples for tracking a silhouette of a performer according to example embodiments.

Specifically, referring to FIG. 5, when the reference joint is a left shoulder joint and a silhouette of a left arm is tracked, the silhouette tracking unit 230 may set a location (p1) of the left shoulder joint as a center of a searching window (a), and retrieve a point (p2) where the searching window (a) and an edge of the left arm are crossed as denoted by 530 in FIG. 5.

Figure 6:
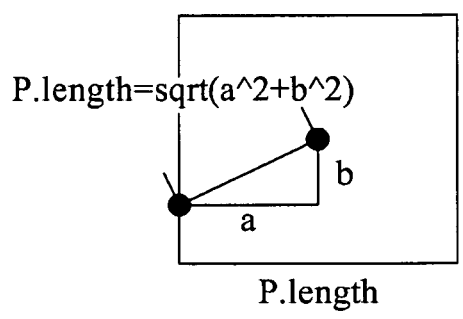
Figure 6:
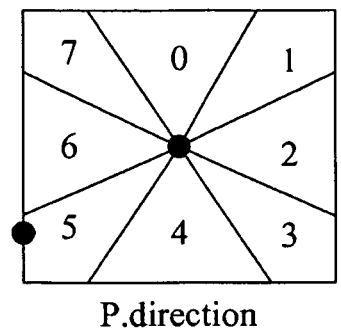

Also, as illustrated in FIG. 6, the silhouette tracking unit 230 may set the point (p2) where the searching window (a) and the edge of the left arm crossed, as a center of a searching window (b), by referring to a predetermined tracking direction (direction corresponding to 5). Accordingly, the silhouette tracking unit 230 may retrieve a point where the searching window (b) and the edge are crossed. The silhouette tracking unit 230 may sequentially retrieve a point where the edge and the searching window are crossed, and thereby may track silhouettes 510 and 520 of the left arm.

In a same manner, the silhouette tracking unit 230 may track a silhouette of a head, a hand, a foot, a leg, a torso, and the like, of the performer. The tracked silhouette of the performer is illustrated in an example 1210 of FIG. 12.

In this instance, as illustrated in FIG. 6, each center point Pi of a searching window may have coordinates (Px, Py) where each of the center points is located, a distance (P.length) from a reference point, and a change angle (P.direction). Here, the change angle may indicate to which direction the distance moves from the reference point.

That is, when a searching window is a circle, an accumulation of radiuses may be the distance (P.length). When the searching window is a rectangle, $sqrt(a^2+b^2)$ may be the distance (P.length). Here, the reference point may be a location of the reference joint or a center of a previous searching window. In this instance, the distance (P.length) and the change angle (P.direction) may be used to determine a point where a joint may be located on a silhouette line.

The joint detection unit 250 may set a joint search area using the motion trajectory, determined by the motion tracking information determination unit 210, and the silhouette tracked by the silhouette tracking unit 230. Also, the joint detection unit 250 may detect the head, the hand, and a joint of the performer in the joint search area. Here, the joint of the performer may include a shoulder joint, an elbow joint, a wrist joint, a knee joint, an ankle joint, and a hip joint of the performer. In this instance, the joint detection unit 250 may detect the joint of the performer in an order from the head, the shoulder joint, the hip joint, the knee joint, and the ankle joint.

Figure 7:
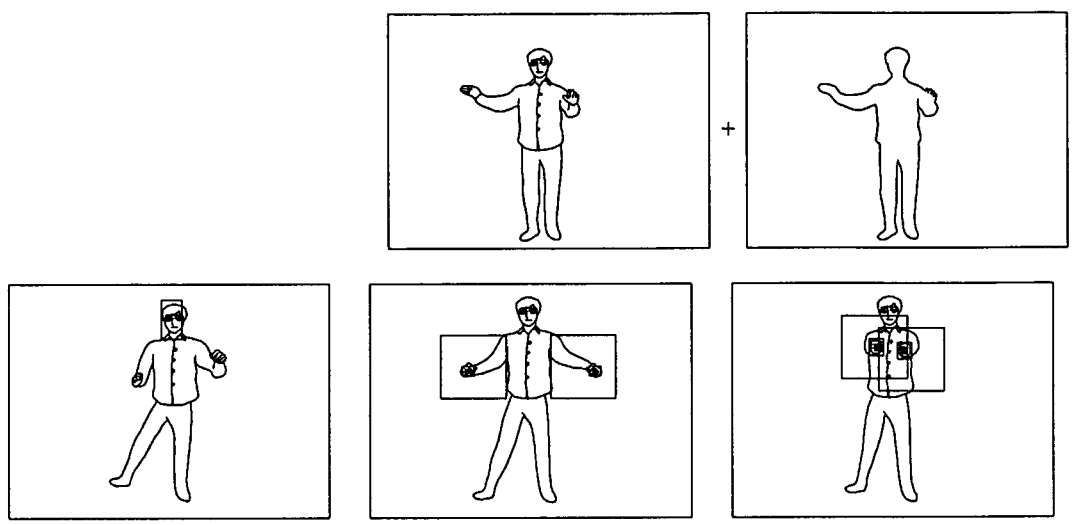
FIGS. 7 through 12 illustrate examples for detecting a joint of a performer according to example embodiments.
Figure 12:
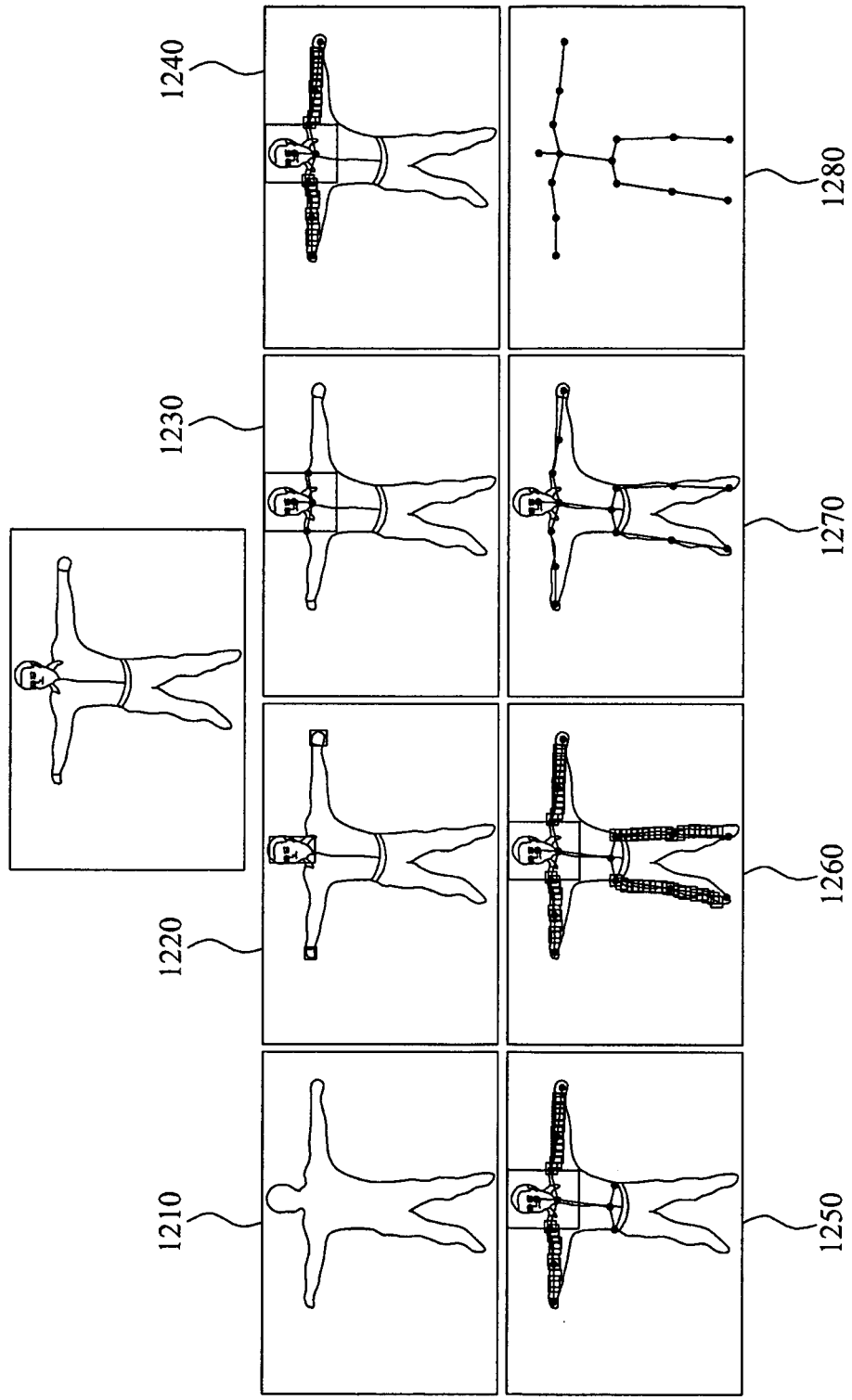

Specifically, referring to FIGS. 7 and 12, when the head and the hand of the performer is detected, the joint detection unit 250 may detect the head and the hand of the performer in the joint search area, using a color, that is, Red, Green, Blue (RGB) of the photographed image based on the head of the performer, as illustrated in an example 1220. In this instance, the joint detection unit 250 may detect only a single head and detect zero through two hands.

That is, the joint detection unit 250 may detect at least one area including a great amount of skin color in the joint search area. Here, it may be assumed that the skin color widely exists between 55 degrees and 90 degrees in a HUE domain.

When a plurality of areas is detected, the joint detection unit 250 may detect a large area as the head, and the small area as the hand. In this instance, when the hand is detected, the joint detection unit 250 may detect the hand by excluding the detected head. When two hands are detected, the joint detection unit 250 may separately detect a right hand and a left hand by referring to a location of the hands in a previous frame.

Here, the joint search area may be set within a body of the performer using the motion trajectory and the silhouette. Through this, the head or hand may be prevented from being detected in an area not associated with a head or a hand.

Figure 8:
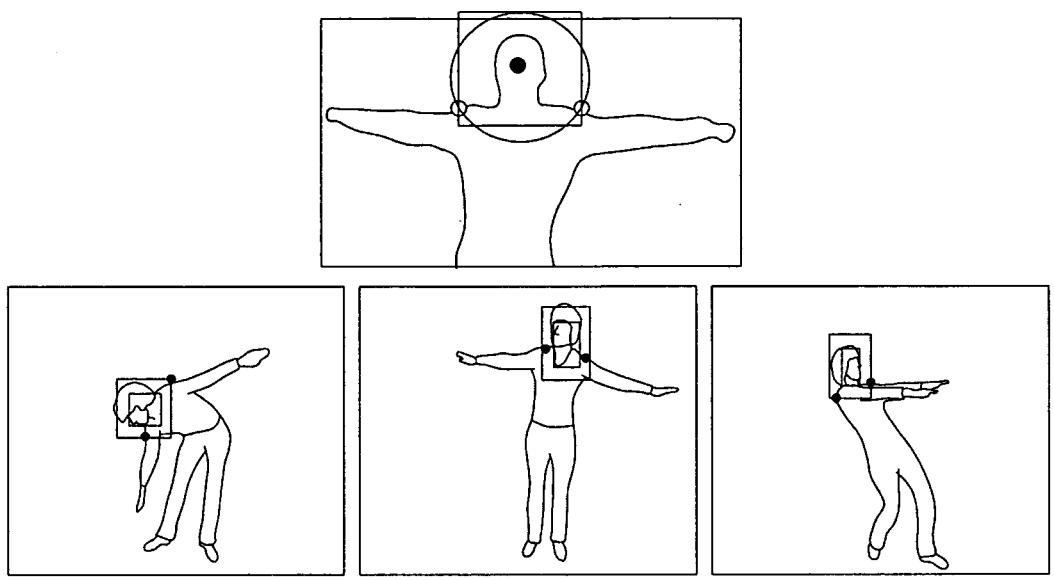

Also, referring to FIGS. 8 and 12, when the shoulder joint of the performer is detected, the joint detection unit 250 may detect a point where the silhouette and a searching window are crossed, based on the detected head, as illustrated in an example 1230. Here, the searching window may have a shape of a rectangle or a circle, and a size of the searching window may be predetermined using the head length of the performer. Through this, as illustrated in FIG. 8, the joint detection unit 250 may set the joint search area to detect the shoulder joint by arranging the searching window based on the detected head.

Figure 9:
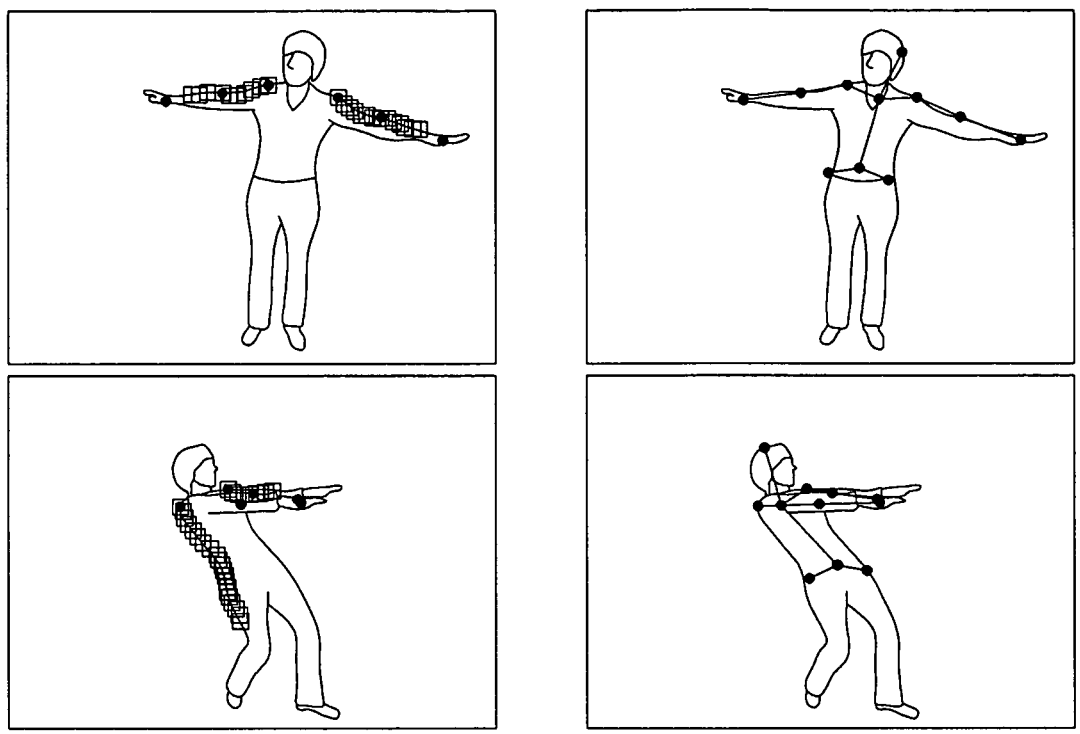

Also, referring to FIGS. 9 and 12, when the elbow joint and the wrist joint of the performer are detected, the joint detection unit 250 may detect the elbow joint and the wrist joint based on the detected shoulder joint using the motion trajectory and the silhouette, as illustrated in an example 1240.

In this instance, when an arm and another body portion of the performer are overlapped, the joint detection unit 250 may detect the wrist joint by referring to a location of the hand. Also, the joint detection unit 250 may detect the elbow joint using previously obtained body proportion information and a distance between the shoulder joint and the wrist joint.

Figure 10:
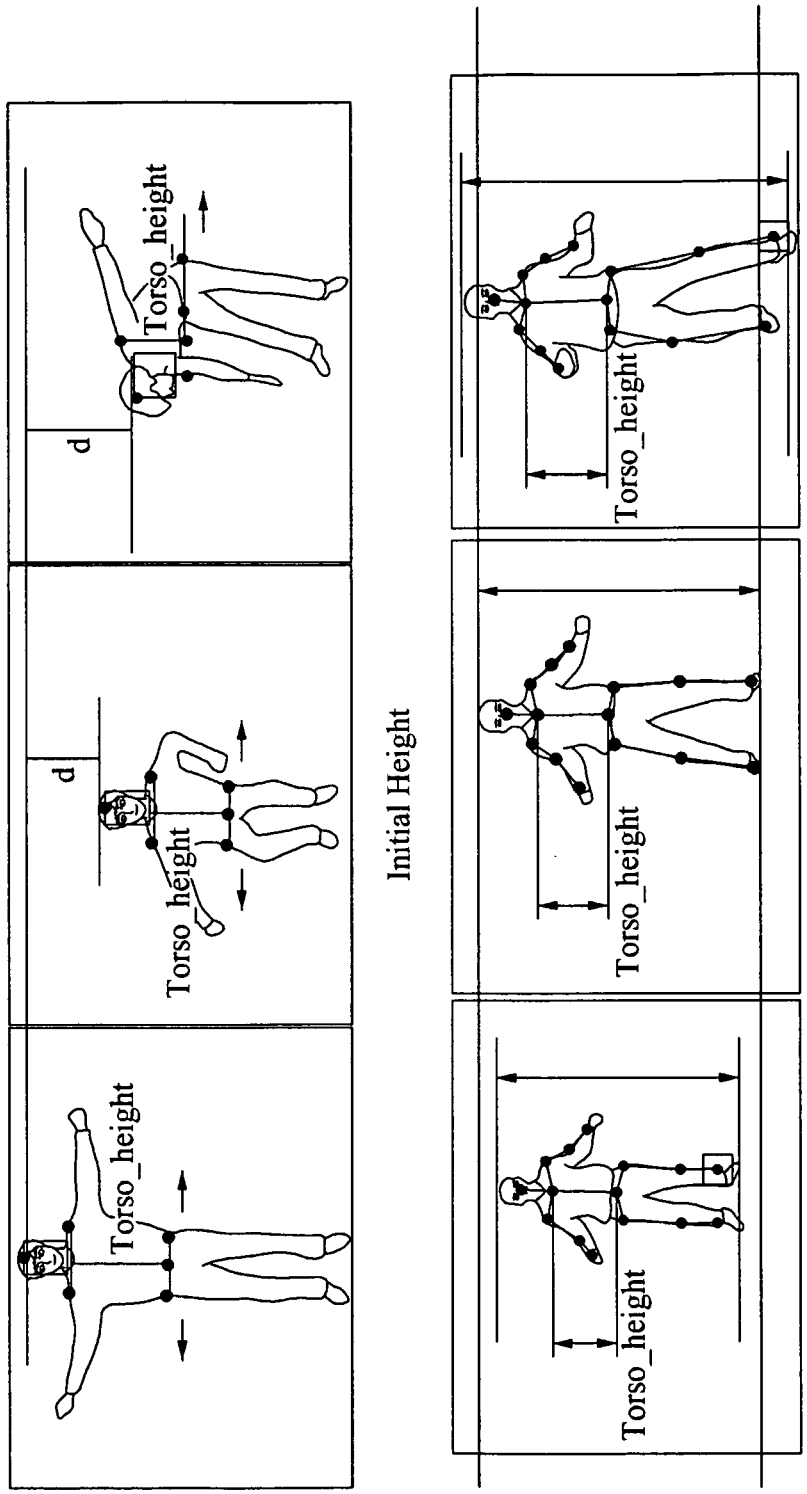

Also, referring to FIGS. 10 and 12, when the hip joint is detected, the joint detection unit 250 may detect the hip joint using a pose and a body size of the performer based on the detected head and shoulder joint.

Specifically, when the performer is standing, the joint detection unit 250 may detect the hip joint by adjusting a height of a torso from a head location when the performer is standing, by a ratio when the head vertically moves (in a y-axis direction) based on the detected head, as illustrated in an example 1250.

In this instance, when the performer is not standing and bows the performer's head, the joint detection unit 250 may calculate the height of the torso (Torso_height) using a distance (d) from the detected head to a head location when the performer bows, as illustrated in FIG. 10. Also, when both shoulder joints are parallel, the joint detection unit 250 may detect the hip joint using an end point which is located vertical to and below a center location of the both shoulder joints by the height of the torso. Here, the joint detection unit 250 may detect the hip joint as a point where the silhouette and a line are crossed. Here, the line may indicate a horizontal line based on the end point.

When the both shoulder joints are not parallel, the joint detection unit 250 may detect the hip joint using an end point which is located vertical to and below a highest location of the both shoulder joints by the height of the torso. Here, the joint detection unit 250 may detect the hip joint as a point where the silhouette and a line are crossed. Here, the line may indicate a horizontal line or a line in any direction based on the end point.

Figure 11:
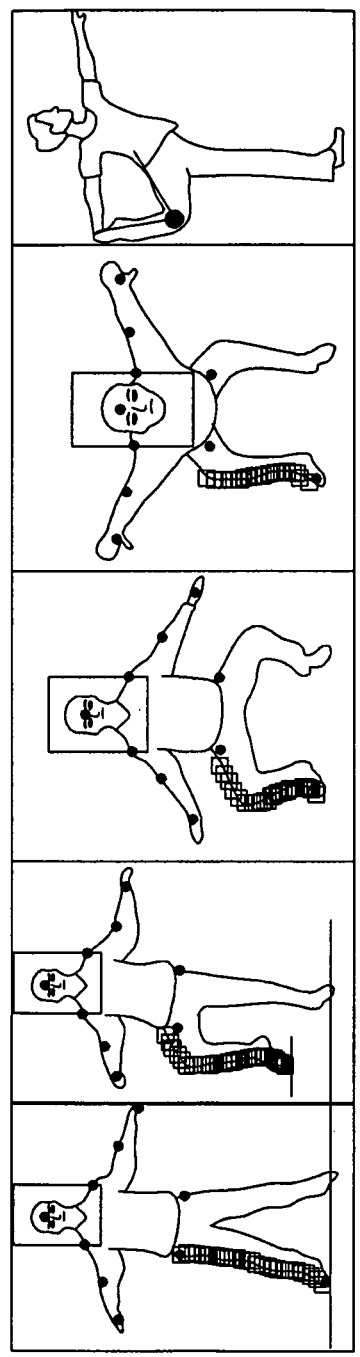

Also, referring to FIGS. 11 and 12, when the knee joint and the ankle joint of the performer are detected, the joint detection unit 250 may detect the knee joint and the ankle joint based on the detected hip joint using the motion trajectory, the silhouette, and the detected hand, as illustrated in an example 1260. In this instance, the joint detection unit 250 may detect the knee joint using body proportion information and a distance between a location of the hip joint and an end point of a foot. Through this, the joint detection unit 250 may detect joints of the performer as illustrated in examples 1270 and 1280.

Figure 13:
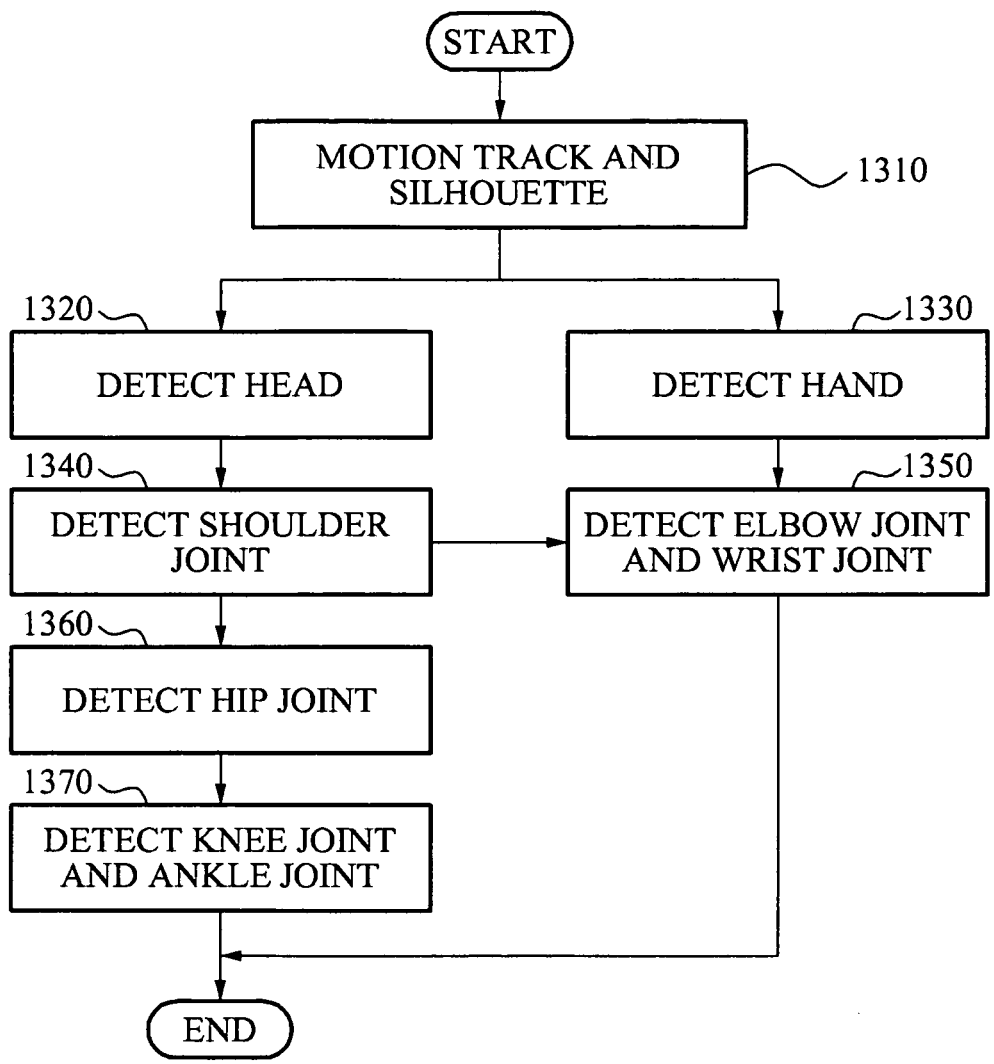
FIG. 13 illustrates a markerless motion capturing method according to example embodiments.

FIG. 13 illustrates a markerless motion capturing method according to example embodiments.

In operation 1310, the motion tracking information determination unit 210 may determine a motion trajectory of a performer in an image photographed by a camera, and a silhouette tracking unit 230 may track a silhouette of the performer in the image.

In operation 1320, a joint detection unit 250 may detect a head of the performer in a joint search area using a color of the image. In operation 1330, the joint detection unit 250 may detect a hand of the performer in the joint search area using the color of the image. In this instance, when a plurality of areas is detected using a skin color, the joint detection unit 250 may detect a large area as the head from among the plurality of areas in operation 1320, and detect a small area as the hand from among the plurality of areas in operation 1330.

In operation 1340, the joint detection unit 250 may detect a shoulder joint using the silhouette and a searching window. That is, the joint detection unit 250 may detect a point where the silhouette and the searching window are crossed based on the detected head as the shoulder joint. Here, the searching window may have a shape of a rectangle or a circle, and a size of the searching window may be predetermined using a head length of the performer.

In operation 1350, the joint detection unit 250 may detect an elbow joint and a wrist joint of the performer based on the detected shoulder joint.

Specifically, when an arm and a body portion of the performer are not overlapped, the joint detection unit 250 may detect the elbow joint and the wrist joint using the motion trajectory and the silhouette. Also, when the arm and the body portion of the performer are overlapped, the joint detection unit 250 may detect the elbow joint and the wrist joint based on the detected shoulder joint, using the motion trajectory, the silhouette, and the hand of the performer.

In operation 1360, the joint detection unit 250 may detect a hip joint of the performer based on the detected shoulder joint and based on whether the performer bows.

Specifically, when the performer is standing, the joint detection unit 250 may detect the hip joint by adjusting a height of a torso from a head location when the performer is standing by a ratio when the head vertically moves (in a y-axis direction) based on the detected head. In this instance, when the performer is not standing and bows the performer's head, the joint detection unit 250 may calculate the height of the torso using a distance (d) from the detected head to a head location when the performer bows, and detects the hip joint using the calculated height of the torso.

In operation 1370, the joint detection unit 250 may detect an ankle joint and a knee joint based on the hip joint, using the motion trajectory, the silhouette, and the hand of the performer.

Figure 14:
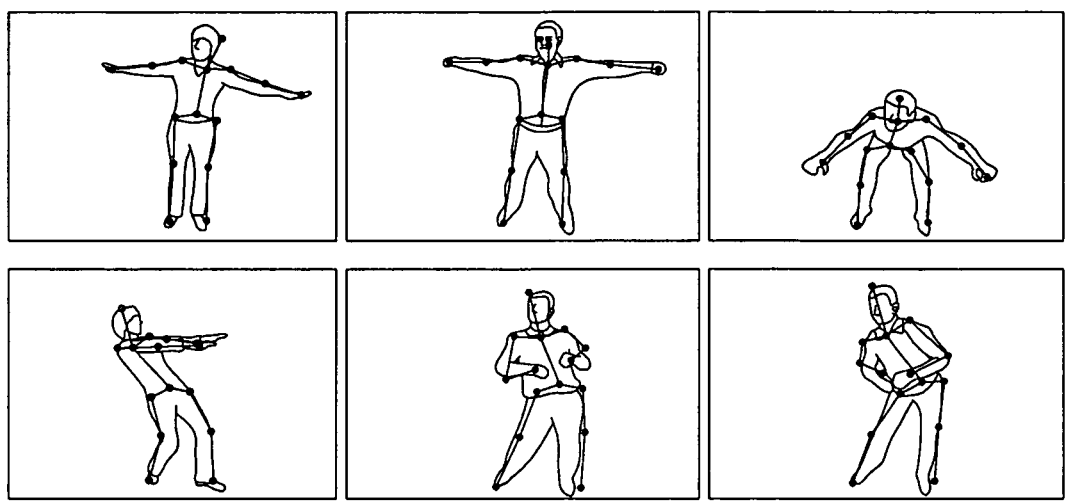
FIG. 14 illustrates an example for detecting a joint of a performer that variously makes poses, according to example embodiments.

As described above, in operation 1320 through operation 1370, the joint detection unit 250 may detect the head, the hand, the shoulder joint, the elbow joint, the wrist joint, the knee joint, the ankle joint, and the hip joint of the performer. Although the performer makes various poses, the joint detection unit 250 may detect joints of the performer even with the poses as illustrated in FIG. 14.

Although the markerless motion capturing method using a single camera has been described, a motion capturing using a plurality of cameras may be performed.

Figure 15:
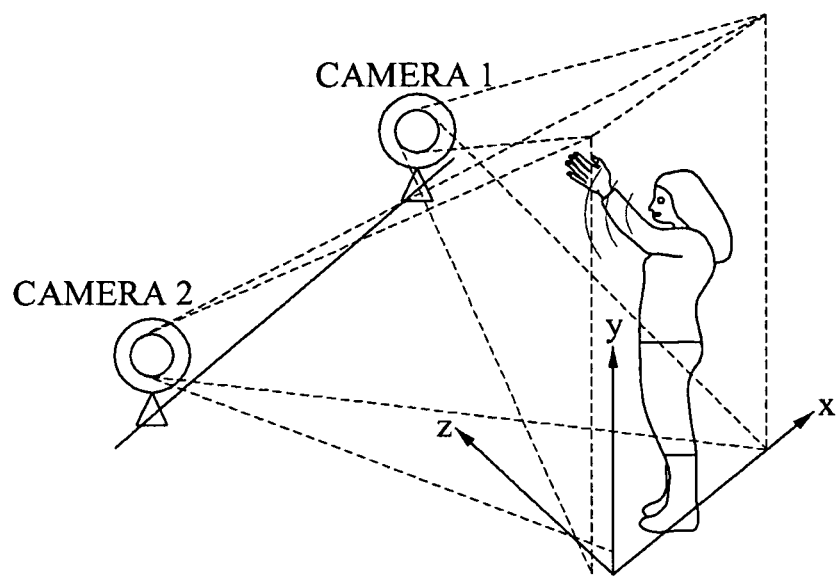
FIG. 15 illustrates a markerless motion capturing apparatus using two cameras according to example embodiments.

FIG. 15 illustrates a markerless motion capturing apparatus using two cameras according to example embodiments.

Referring to FIG. 15, the markerless motion capturing apparatus may receive an image of a performer, and capture a motion of the performer. The image may be photographed by the two cameras. Also, the two cameras may be arranged in front of the performer by a predetermined distance. Here, the distance between each of the two cameras and the performer may be predetermined to enable an entire body of the performer to be photographed.

Figure 16:
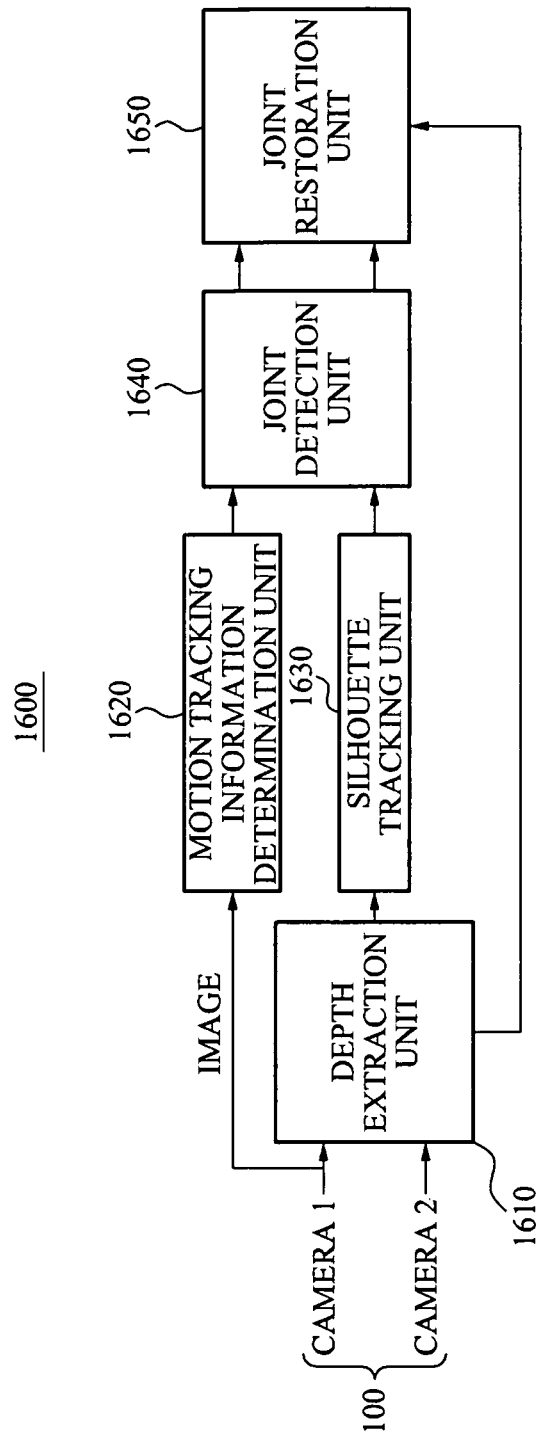
FIG. 16 illustrates a configuration of a markerless motion capturing apparatus using two cameras according to example embodiments.

FIG. 16 illustrates a configuration of a markerless motion capturing apparatus using two cameras according to example embodiments.

Referring to FIG. 16, the markerless motion capturing apparatus may include a depth extraction unit 1610, a motion tracking information determination unit 1620, a silhouette tracking unit 1630, a joint detection unit 1640, and a joint restoration unit 1650.

The depth extraction unit 1610 may extract a depth, included in an image, using a stereo image received from each of the two cameras.

The motion tracking information determination unit 1620 may calculate body information of a performer from an image, and determine a motion trajectory of the performer. The image may be photographed and inputted from any one of the two cameras. Here, since the motion tracking information determination unit 1620 is identical to the motion tracking information determination unit 210 of FIG. 2, further descriptions are omitted.

The silhouette tracking unit 1630 may track a silhouette of the performer in the image inputted from the depth extraction unit 1610.

The joint detection unit 1640 may detect a head, a hand, a shoulder joint, an elbow joint, a wrist joint, a knee joint, an ankle joint, and a hip joint of the performer using the motion trajectory and the silhouette. That is, the joint detection unit 1640 may detect a joint in two-dimensional (2D) space of the performer. Here, since an operation of the joint detection unit 1640 is identical to that of the joint detection unit 250, further descriptions are omitted.

The joint restoration unit 1650 may restore the joint in 2D into a joint in three-dimensional (3D) space using the extracted depth, the motion trajectory and the silhouette. Here, the depth may indicate a z-distance in FIG. 14.

Figure 17:
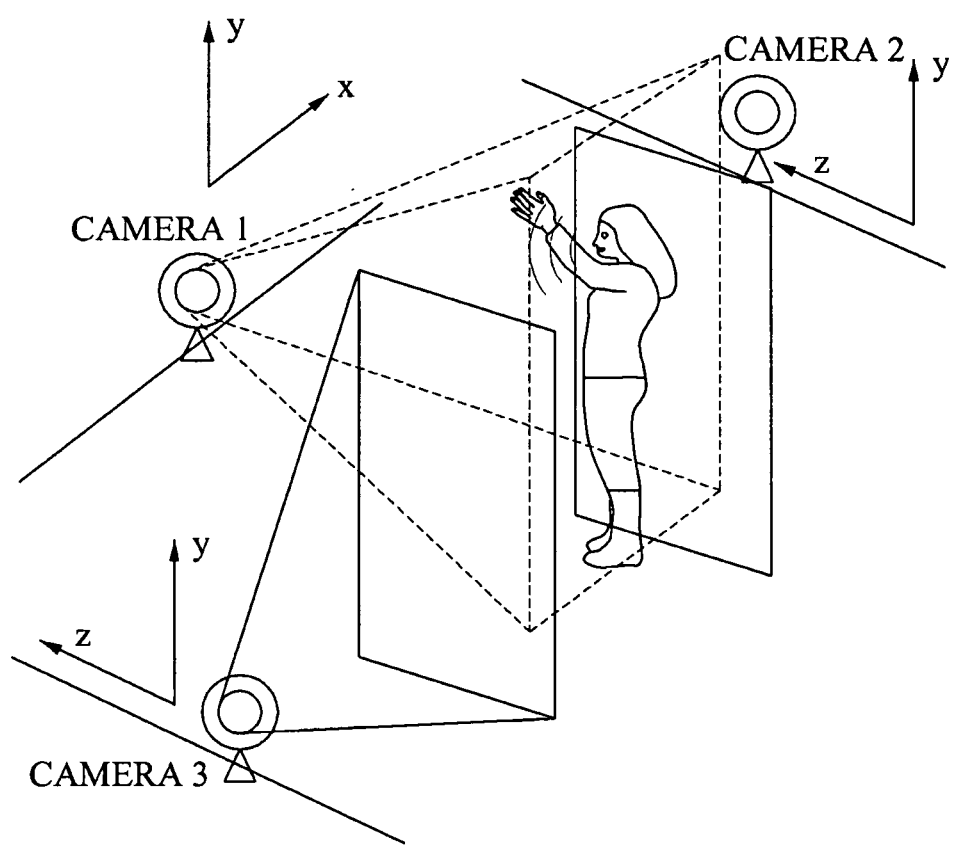
FIG. 17 illustrates a markerless motion capturing apparatus using three cameras according to example embodiments.

FIG. 17 illustrates a markerless motion capturing apparatus using three cameras according to example embodiments.

Referring to FIG. 17, the markerless motion capturing apparatus may receive an image of a performer, and capture a motion of the performer. The image may be photographed by the three cameras. In this instance, a single camera may be arranged in front of the performer, and the other two cameras may be arranged on a left and right side of the performer. Also, each of the three cameras may be arranged to enable an entire body of the performer to be photographed.

Figure 18:
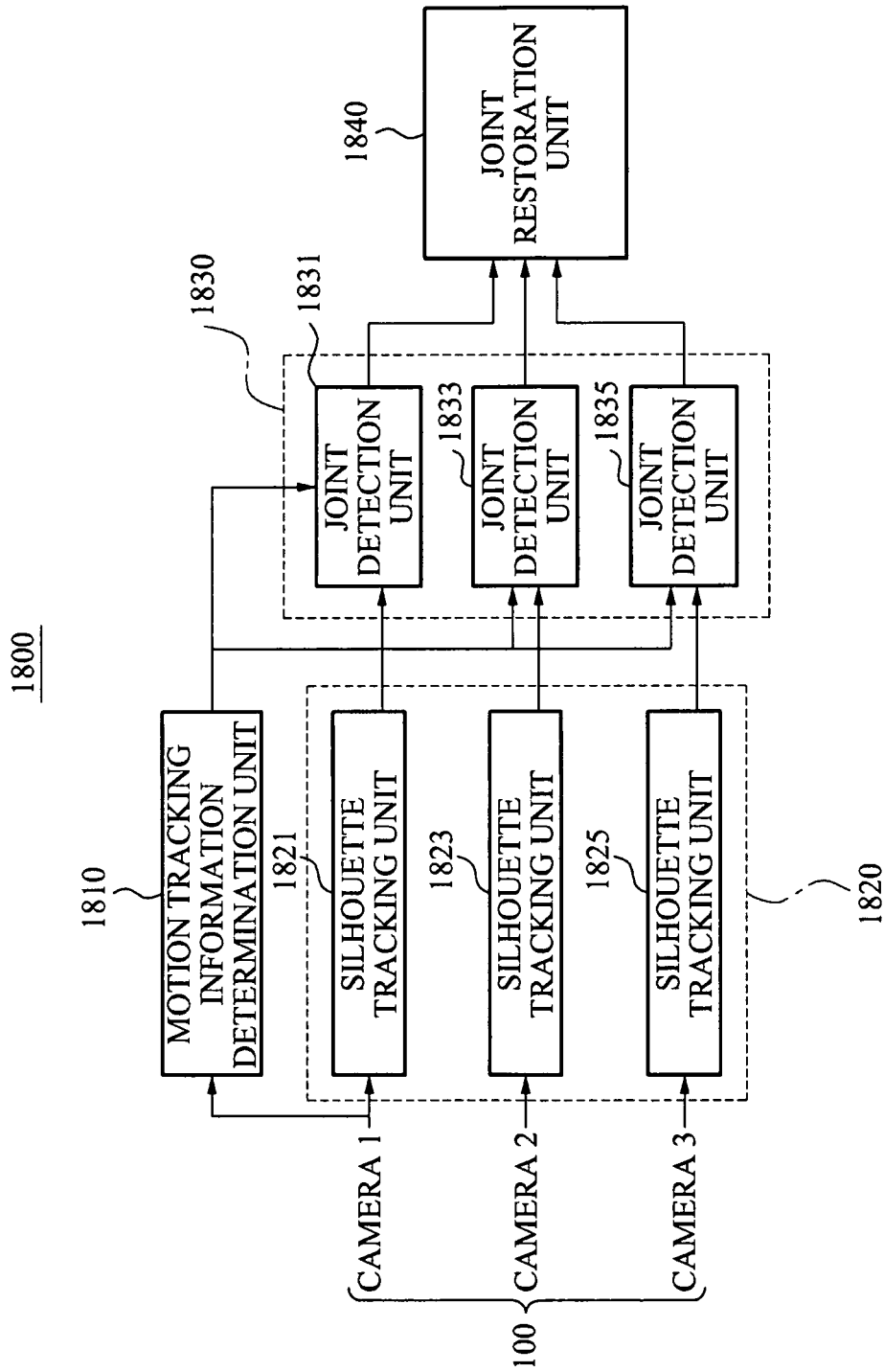
FIG. 18 illustrates a configuration of a markerless motion capturing apparatus using three cameras according to example embodiments.

FIG. 18 illustrates a configuration of a markerless motion capturing apparatus using three cameras according to example embodiments.

Referring to FIG. 18, the markerless motion capturing apparatus may include a motion tracking information determination unit 1810, a silhouette tracking unit 1820, a joint detection unit 1830, and a joint restoration unit 1840.

The motion tracking information determination unit 1810 may calculate body information of a performer from an image, which is received from any one from among the three cameras, and determine a motion trajectory of the performer. Here, since the motion tracking information determination unit 1810 is identical to the motion tracking information determination unit 210 of FIG. 2, further descriptions are omitted The silhouette tracking unit 1820 may track a silhouette of the performer with respect to an image which is received from each of the three cameras using silhouette tracking unit 1821, silhouette tracking unit 1822, and silhouette tracking unit 1823 respectively as shown in FIG. 18.

The joint detection unit 1830 may detect a joint of the performer using the motion trajectory and the three silhouettes using joint detection unit 1831, joint detection unit 1832, and joint detection unit 1833 respectively as shown in FIG. 18. In this instance, the joint detection unit 1830 may detect the joint of the performer from each of the three silhouettes, and the detected joint of the performer may be in 2D.

The joint restoration unit 1840 may restore a joint in 3D of the performer using the three joints in 2D detected by the joint detection unit 1830.

For example, the camera used in the markerless motion capturing apparatus may be a web camera, a digital camera, and a camcorder, that may be attached to and removed from the markerless motion capturing apparatus 200.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. The computer-readable media may also be a plurality of storage devices in a distributed network, so that the program instructions are stored and executed in a distributed fashion. The program instructions may be executed by one or more processors or processing devices. The computer-readable media may also be embodied in at least one application specific integrated circuit (ASIC) or Field Programmable Gate Array (FPGA).

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A markerless motion capturing apparatus, comprising:
a motion tracking information determination unit to calculate body information of a performer from an image, and to determine a motion trajectory of the performer based on the calculated body information;
a silhouette tracking unit to track a silhouette of the performer in the image; and
a joint detection unit to detect a joint of the performer using the motion trajectory and the silhouette,
wherein the motion tracking unit, the silhouette tracking unit, and the joint detection unit use at least one processor.

2. The markerless motion capturing apparatus of claim 1, wherein the motion tracking information determination unit calculates a size of a body portion of the performer from the image including an entire body of the performer, and determines the motion trajectory indicating a range that the body portion moves.

3. The markerless motion capturing apparatus of claim 1, wherein the silhouette tracking unit sequentially retrieves a point where the silhouette and a searching window are crossed, and tracks the silhouette of the performer, the searching window being set based on a location of a reference joint.

4. The markerless motion capturing apparatus of claim 1, wherein the joint detection unit detects the joint of the performer in a joint search area which is determined based on the motion trajectory and the silhouette.

5. The markerless motion capturing apparatus of claim 1, wherein the joint detection unit detects at least one of a head, a hand, a shoulder joint, an elbow joint, a wrist joint, a knee joint, an ankle joint, and a hip joint of the performer using the motion trajectory and the silhouette, or detects the joint of the performer in an order from the head, the shoulder joint, the hip joint, the knee joint, and the ankle joint.

6. The markerless motion capturing apparatus of claim 5, wherein:
the joint detection unit detects the shoulder joint based on the head of the performer,
the joint detection unit detects the elbow joint, the wrist joint, and the hip joint based on the detected shoulder joint of the performer,
the joint detection unit detects the knee joint and the ankle joint based on the detected hip joint,
the joint detection unit detects the head and the hand in a joint search area, determined based on the silhouette, using a color of the image,
the joint detection unit detects the shoulder joint as a point where the tracked silhouette and a searching window are crossed, which is determined based on the detected head of the performer, are crossed, and
the joint detection unit adjusts a height of a torso based on a head location when the performer is standing, and adjusts a head location that changes depending on a pose of the performer, to detect the hip joint.

7. The markerless motion capturing apparatus of claim 6, wherein the joint detection unit detects at least one of the elbow joint, the wrist joint, the knee joint, and the ankle joint of the performer using the motion trajectory, the silhouette, and the hand.

8. The markerless motion capturing apparatus of claim 1, further comprising:
a depth extraction unit to extract a depth using an image received from each of two photographing apparatuses, and the joint detection unit comprises:
a joint detection unit to detect a joint in two-dimensional (2D) space of the performer using the motion trajectory and the silhouette; and
a joint restoration unit to restore a joint in three-dimensional (3D) space from the 2D joint of the performer using the depth.

9. The markerless motion capturing apparatus of claim 1, wherein:
the motion tracking information determination unit calculates body information of the performer from an image which is received from a photographing apparatus, located in front of the performer, from among three photographing apparatuses,
the silhouette tracking unit tracks a silhouette of the performer with respect to an image which is received from each of the three photographing apparatuses, and
the joint detection unit comprises:
a joint detection unit to detect a joint in 2D space of the performer with respect to the image, received from each of the three photographing apparatuses, using the motion trajectory and the silhouette; and
a joint restoration unit to restore a 3D joint of the performer using a location of the 2D joint detected from the image received from each of the three photographing apparatuses.

10. A markerless motion capturing method, comprising:
calculating body information of a performer from an image, and determining a motion trajectory of the performer based on the calculated body information;
tracking a silhouette of the performer in the image; and
detecting a joint of the performer using the motion trajectory and the silhouette using at least one processor.

11. The markerless motion capturing method of claim 10, wherein the determining of the motion trajectory of the performer includes calculating a size of a body portion of the performer from the image including an entire body of the performer, and determines the motion trajectory indicating a range that the body portion moves.

12. The markerless motion capturing method of claim 10, wherein the tracking of the silhouette of the performer in the image includes sequentially retrieving a point where the silhouette and a searching window are crossed, and tracks the silhouette of the performer, the searching window being set based on a location of a reference joint.

13. The markerless motion capturing method of claim 10, wherein the detecting of the joint of the performer includes detecting the joint of the performer in a joint search area which is determined based on the motion trajectory and the silhouette.

14. The markerless motion capturing method of claim 10, wherein the detecting of the joint of the performer includes detecting at least one of a head, a hand, a shoulder joint, an elbow joint, a wrist joint, a knee joint, an ankle joint, and a hip joint of the performer using the motion trajectory and the silhouette.

15. The markerless motion capturing method of claim 14, wherein the detecting of the joint of the performer includes detecting the joint of the performer in an order from the head, the shoulder joint, the hip joint, the knee joint, and the ankle joint.

16. At least one non-transitory computer readable medium storing computer readable instructions that control at least one processor to implement the method claim 10.

* * * * *

UNITED STATES PATENT AND TRADEMARK OFFICE
CERTIFICATE OF CORRECTION

PATENT NO.         : 8,644,552 B2                                       Page 1 of 1
APPLICATION NO.    : 12/923864
DATED              : February 4, 2014
INVENTOR(S)        : Han et al.

It is certified that error appears in the above-identified patent and that said Letters Patent is hereby corrected as shown below:

On the Title Page Item [56] (OTHER PUBLICATIONS), Line 3, delete "Piscatway," and insert
-- Piscataway, --, therefor.
On the Title Page Item [56] (OTHER PUBLICATIONS), Line 10, delete "Internactive" and insert
-- Interactive --, therefor.

In the Claims

Column 10, Line 64, In Claim 16, delete "method claim" and insert -- method of claim --, therefor.

Signed and Sealed this
First Day of July, 2014

Michelle K. Lee
*Deputy Director of the United States Patent and Trademark Office*